No. 773,200. PATENTED OCT. 25, 1904.
G. C. DIEHL.
GAS MACHINE.
APPLICATION FILED NOV. 27, 1903.
NO MODEL. 2 SHEETS—SHEET 1.
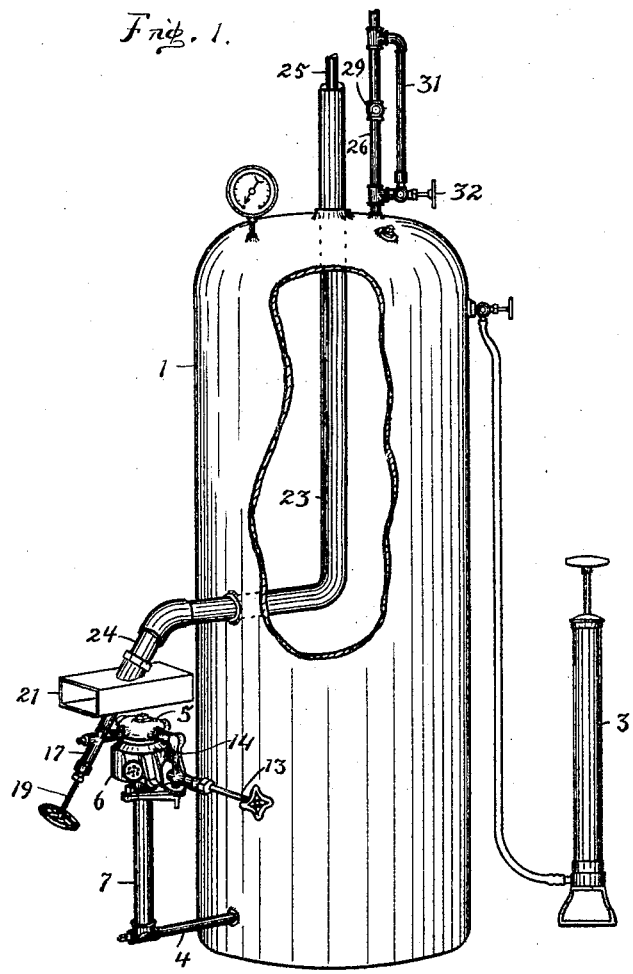
WITNESSES:
N. J. Burns
Augusta Viberg.
George C. Diehl   INVENTOR
BY Chapin & Denny
His ATTORNEYS No. 773,200. PATENTED OCT. 25, 1904.
G. C. DIEHL.
GAS MACHINE.
APPLICATION FILED NOV. 27, 1903.
NO MODEL. 2 SHEETS—SHEET 2.
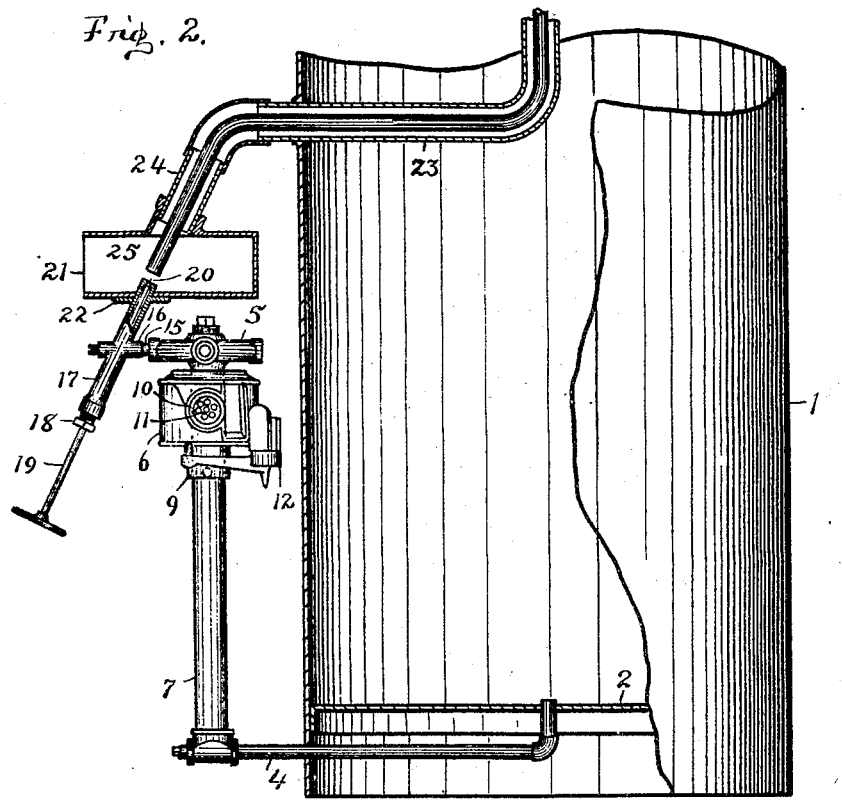
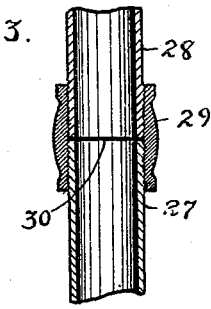
WITNESSES: George C. Diehl INVENTOR
BY Chapin & Denny
HIS ATTORNEYS No. 773,200.

Patented October 25, 1904.

UNITED STATES PATENT OFFICE.

GEORGE C. DIEHL, OF BUTLER, INDIANA, ASSIGNOR TO THE BUTLER ARC LIGHT COMPANY, OF BUTLER, INDIANA.

GAS-MACHINE.

SPECIFICATION forming part of Letters Patent No. 773,200, dated October 25, 1904.

Application filed November 27, 1903. Serial No. 182,794. (No model.)

*To all whom it may concern:*

Be it known that I, GEORGE C. DIEHL, a citizen of the United States, residing at Butler, in the county of Dekalb, in the State of Indiana, have invented certain new and useful Improvements in Carbureters; and I do hereby declare that the following is a full, clear, and exact description of the invention, which will enable others skilled in the art to which it appertains to make and use the same, reference being had to the accompanying drawings, which form part of this specification.

My present invention relates to improvements in gas-machines.

The object of my invention is to provide an improved gas-machine for the manufacture of gas from a liquid hydrocarbon, such as gasolene, specially designed and adapted for lighting purposes, and is an improvement upon a gas-machine shown and described by me in application Serial No. 139,970, filed January 21, 1903.

My invention consists of an upright fuel-oil tank, a gas-generator arranged at the side of the tank and near the bottom thereof and having a pipe connection with the interior thereof, a gas-supply pipe passing upward through the tank and arranged within a heating-pipe adapted to secure it against contact with the body of the gasolene in the tank, a mixing-chamber interposed between the generator and the lower and adjacent end of the supply-pipe to regulate the candle-power of the gas, a self-cleaning valve leading from the generator to the mixing-chamber, and a safety-valve mounted upon the top of the tank communicating with the interior of the tank at its lower end and having its upper end leading to the open air.

The principal novel features of my present invention reside in my improved self-cleaning gas-supply valve and in my surmounted safety-valve adapted to permit the escape of the gaseous contents of the tank into the open air under certain described conditions.

Similar reference-numerals in the accompanying drawings indicate like parts in the several views, in which—

Figure 1 is a perspective view of my invention with the tank broken away in part and showing the relative arrangement of the operative parts. Fig. 2 is an enlarged view of the generator and its connections with the tank broken away in part, the heating-pipe and mixing-box being in vertical section to show the arrangement of the gas-conveying pipe, and the self-cleaning valve partly broken away. Fig. 3 is an enlarged detail of a portion of the safety-valve shown in vertical central section.

My improved gas-machine is designed to employ gasolene or other liquid hydrocarbon which can readily be vaporized.

The upright tank or reservoir 1, in which the gasolene is stored, has a raised bottom 2 and may have a proper hand-pump 3 to maintain a suitable pressure in the tank to feed the liquid upward through an outlet or feed pipe 4 to a retort-vaporizer 5 of any proper construction, preferably as shown. The feed-pipe 4 is connected to the vertical pipe 7, which in turn carries the retort-generator 5. This generator is mounted on the end of pipe 7 and comprises a chamber or head provided with vapor-pipes 14 and 15. The vapor-pipe 14 is provided with a vapor-outlet controlled by the ordinary form of needle-valve 13 and is arranged to deliver vapor to the subburner 6, which is rotatably mounted on the feed-pipe 7 just below the retort 5 and is secured against displacement by means of an adjustable collar 9.

The burner 6 consists of an open-topped cylindrical shell having a lateral inlet-opening 10 and provided with a perforated sheet-metal lining 11, arranged as described in the above-described application, Serial No. 139,970. This burner 6 has a flash-pan 12, in which a small quantity of liquid is admitted through the valve 13 from the retort 5 through the pipe 14. This liquid in the pan 12 is ignited and produces sufficient flame in starting the apparatus to generate enough gas in the retort to continuously furnish a proper supply of gas to keep the subburner in full operation. As soon as the generating process is started the burner is rotated from the position shown in Fig. 1 to the position shown in Fig. 2, in which the inner end of the valve 13 is directly opposite the said lateral opening of the burner 6 and is adapted to continuously furnish the burner with a proper predetermined supply of fuel-gas.

At approximately right angles to the upper end of the pipe 14 the short pipe 15 has its inner end mounted in a proper screw-threaded opening in the side of the retort and has its outer end fixed in a lateral boss 16 on the pipe 17, whose outer end has a perforated screw-plug 18, in which is rotatably mounted a gas-supply valve 19, provided with a needle-point 20 upon its inner end adapted when closed to rest in a proper conical seat in a contracted opening in the inner end of the pipe 17, which is arranged within the mixing-box 21, Fig. 2, which rests upon and is supported by an annular flange 22 on the pipe 17.

In a suitable screw-threaded vertical opening in the top of the mixing-box 21 is adjustably mounted the lower screw-threaded end of a pipe 23, through which the admixture of air and gas passes upward to the point of consumption. This pipe 23 is secured in any desired vertical adjustment relative to the adjacent outlet end of the pipe 17 by means of the short pipe-section 24 or other proper manner.

A pipe 25 is arranged within the pipe 23 within the tank and has its lower end arranged in the mixing-box 21 in close proximity to but out of contact with the adjacent end of the pipe 17. The inner pipe 25 after emerging from its outer pipe passes upward and onward to the point of consumption. By this arrangement the inner or gas-supply pipe is not only kept away from the chilling contact of the cold gasolene within the tank, but is also continuously surrounded by an ascending body of warm air from the mix-box and rising from the burner.

The inclosing pipe 23 is open at both ends, as shown. On the top of the tank 1 is rigidly fixed my improved safety valve or attachment, as shown in Fig. 1, consisting of an upright pipe 26 open at both ends, having its lower end secured in the top of the tank by a screw-threaded connection and having its upper end extended to discharge into the open air and outside of the building in which the carbureter is used. This pipe 26 is preferably in two sections 27 and 28, Fig. 3, which are externally screw-threaded at their meeting ends and are rigidly secured by a screw-threaded collar 29. Between these meeting ends is arranged a diaphragm 30 of proper strength and material to give way to a certain predetermined upward pressure of gas from the tank 1, as where the building in which the gas-machines is located is on fire. The contents of the tank can be vaporized and escape into the open air without danger of an explosion.

A second short pipe 31 in parallel arrangement with the pipe 26 has its opposite bent ends secured in lateral openings in the pipe 26 and has a cock or rotary valve 32 at its lower end, whereby when it is desired to refill the tank by opening the valve 32 the replaced foul air of the tank will escape upward through the pipes 31 and 26 into the outer air instead of into the building as the tank is filling, after which the valve 32 is closed.

The operation of my invention thus described is obvious and, briefly stated, is as follows: The tank 1 being properly filled with gasolene, a sufficient air-pressure is applied by means of the hand-pump 3, after which the burner 6 is lighted in a well-understood manner, thereby converting the liquid in the retort 8 and the upper end of the pipe 7 into gas. The valve 19 is now opened, which permits the gas generated in the retort to pass upward through the pipe 17 into the mixing-box 21, where it receives a proper amount of air to fit it for the desired burning mixture and then enters the lower end of the pipe 25 and passes upward to the point of consumption through the pipe 18. A small amount of the gas generated in the retort 5 is continuously supplied to the burner 6 through the pipe 14 and the opening 10 of the burner. A large portion of the escaping heat of the burner will ascend through the pipe 23, which incloses the gas-pipe 25, whereby this waste product of combustion is utilized to keep up the temperature of the gas in its ascent through the tank to insure a proper pressure in use and to materially aid in warming the gasolene in the tank.

Obviously the needle-valve 19 is self-cleaning and obviates the usual difficulty in keeping the small gas-opening in the pipe 17 from becoming clogged in use.

Having thus described my invention and the manner of employing the same, what I desire to secure by Letters Patent is—

1. The combination of the reservoir, a heating-pipe extending therethrough, a retort-vaporizer in communication with the reservoir, a burner arranged below the vaporizing-chamber and connected therewith, a gas-supply pipe leading through the heating-pipe and serving to convey the burning mixture to a point of consumption, a safety-valve upon the top of the tank adapted to automatically open under an abnormal gas-pressure, and having a valved shunt-pipe to permit the escape of the air from the tank when the said safety-valve is closed.

2. The combination of the reservoir, a heating-pipe extending therethrough and provided upon its lower end with a mixing-box, a retort-vaporizer in communication with the reservoir; a burner arranged below the vaporizing-chamber and connected therewith; a needle feed-valve having its upper end arranged within the mixing-box in proximity to and in alinement with the lower end of the supply-pipe;

a gas-supply pipe leading through the heating-pipe and serving to convey the burning mixture to a point of consumption; a safety-valve consisting of an upright pipe mounted upon the top of the tank and leading to the outer air and having a soft-solder valve or plug adapted to open under an abnormal gas-pressure.

3. In a gas-machine, the combination with a reservoir of a vertically-arranged supply-pipe; a generator-head mounted on the upper end of such pipe; a subburner rotatably mounted on the pipe below the generator; a vapor or supply pipe arranged to deliver vapor to the said burner; a second vapor-pipe laterally projecting from said generator and provided with a second pipe arranged at an acute angle to the first pipe, said second pipe having a vapor-jet outlet, and a flange adjacent to said outlet; a needle-valve in such second pipe arranged to control the jet-outlet therein; a mixing-box supported on said flange; an air-pipe leading from said box and through said reservoir; and a service-pipe having its open end in said box in position to receive vapor from the vapor-pipe, and carried through the air-pipe, substantially as described.

4. In a gas-machine, a safety-valve consisting of an upright pipe communicating at one end with the interior of the tank and at its other end with the outer air, and provided with a valve or soft-solder plug adapted to give way under an abnormal gas-pressure; and a short pipe communicating at both ends with the interior of the said upright pipe and provided with an outlet-valve adapted to permit the displaced air of the tank to escape into the open air when the tank is filling.

Signed by me, at Butler, Dekalb county, State of Indiana, this 30th day of October, 1903.

GEORGE C. DIEHL.

Witnesses:
JEFF N. BOYLE,
E. B. HUNTER.